Oct. 13, 1942.   H. NUTT   2,299,029
FRICTION CLUTCH
Filed Feb. 14, 1940
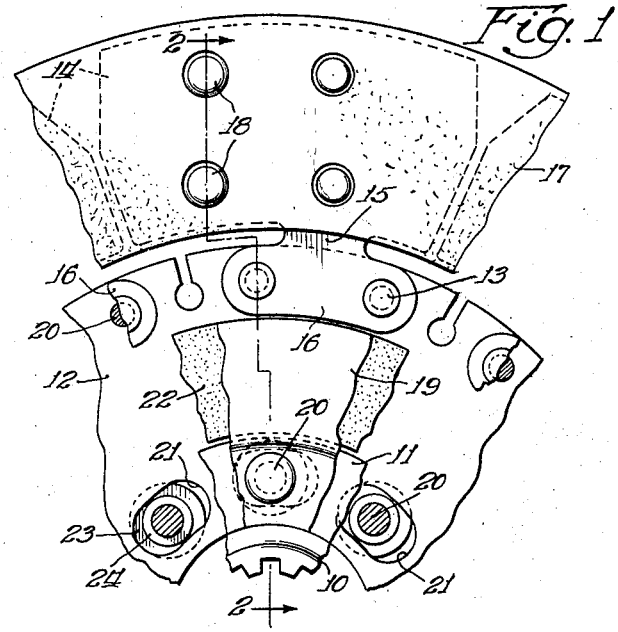
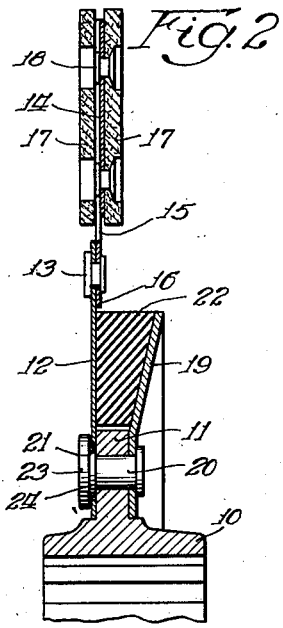
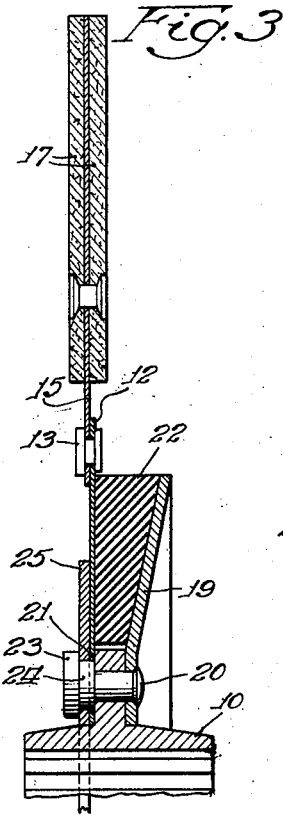
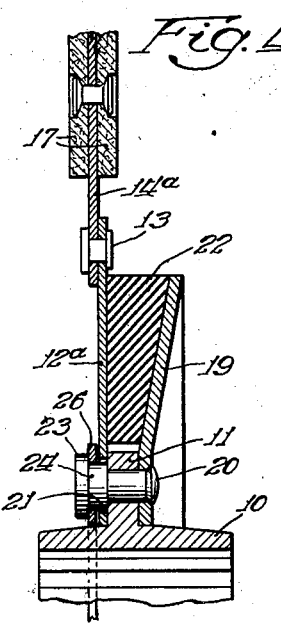
Inventor:
Harold Nutt
By: Edward C. Grrybaugh
Atty.

Patented Oct. 13, 1942

2,299,029

UNITED STATES PATENT OFFICE 2,299,029

FRICTION CLUTCH

Harold Nutt, Chicago, Ill., assignor to Borg-Warner Corporation, Chicago, Ill., a corporation of Illinois Application February 14, 1940, Serial No. 318,815

10 Claims. (Cl. 192—68)

This invention relates to friction clutch driven members and has as its general object to provide an improved torsional vibration dampening torque transmitting connection between the hub and the facing mounting disc of such a plate.

In general, the invention contemplates the employment of an annular cushion of rubber or equivalent material, adapted to transmit torque from the facing to the hub through shear stresses set up in the cushion. Torsional vibration dampeners of this general type are old, but my invention contemplates an improved and simplified construction wherein a cushion anchor disc is secured to one side of an integral radial flange on the hub by means of rivets or equivalent securing elements which extend through the flange, and wherein a facing mounting disc, associated with the other side of the flange, has a torque transmitting connection with the cushion anchor flange through the medium of a ring of soft rubber or the like, and has a lost motion oscillatory connection with the hub formed by projecting end regions of the said securing elements, coacting with spaced regions of the mounting disc. Thus the rivets or other securing elements serve a double function of securing the anchor disc in place and forming a lost motion connection with the mounting disc. As a result, the expense of construction is considerably less and a reduction in spinning inertia is obtained.

Another object of the invention is to provide a friction clutch driven member wherein the inertia and the axial dimension of the driven member are reduced by reducing the thickness of the mounting disc. Originally, it was customary to employ a fairly heavy sheet metal to form the disc upon which the facings of a driven member were mounted, and such disc was extended to the outer periphery of the plate. Such driven members were possessed of relatively high spinning inertia. It has previously been proposed to materially reduce this spinning inertia by reducing the thickness of the peripheral portion of the disc to form a series of relatively thin yieldable cushioning elements having greatly reduced inertia. In such driven members, the central portion of the disc remained as thick as formerly, running as high as 10 gauge. The present invention proposes to reduce the thickness of the central disc so that it is just as thin as the cushions and may if desired be made of the same material. However, material of such thinness will not stand up under the action of the coil springs embodied in the conventional torsional vibration dampener. Such springs, acting against the edges of the mounting disc, in the windows in which such springs are received in the conventional dampener construction, would cut into the thin material proposed to be employed in the present invention, and as a result, the clutch driven member will not stand up.

This problem is solved in the present invention, by the employment of cushioning means which has torque transmitting engagement with the mounting disc throughout substantially the entire exposed area thereof, so that the torque is not concentrated in small areas as it is in the conventional coil spring type of dampener. In addition, the cushion, being bonded to the mounting disc, tends to give axial support to the disc. As a result, a much thinner disc may be employed, and the invention contemplates therefore the combination of a disc of such thinness as to be incapable of standing up in connection with the conventional coil spring dampener, together with a cushion which is attached to the disc over most of its exposed surface so as to transmit torque without damage to the disc, and so as to support the disc.

Other objects, the advantages and uses of the invention will become more apparent after reading the following specification and claims, and after consideration of the drawing forming a part of the specification, wherein:

Fig. 1 is a side elevation of a portion of a disc embodying the invention, parts being broken away to better illustrate the construction;

Fig. 2 is an axial sectional view of the same taken as indicated by the line 2—2 of Fig. 1;

Fig. 3 is an axial sectional view of a somewhat modified form of the invention; and Fig. 4 is an axial sectional view of a further modified form of the invention.

As an example of one form in which the invention may be embodied, I have shown in the drawing a clutch driven member comprising a hub 10 having intermediate its ends a radially projecting flange 11. Associated with one side of the flange 11 is a mounting disc 12 which is of thin sheet metal, in the neighborhood of .020 inch thick as contrasted to a disc of approximately .060 inch used in conventional plates employing the coil spring type of dampener. To the periphery of the mounting disc 12 there is secured by means of rivets 13, a series of circumferentially separated axially distorted cushions 14 of thin resilient sheet metal, each having a reduced neck region 15 connecting it to the tab 16 which is riveted to the mounting disc 12. Mounted on either side of the cushions 14 are a pair of annular facings 17, which are secured to the cushions by means of rivets 18.

Secured to the side of the flange 11 opposite the mounting disc 12 is a cushion anchor disc 19. The anchor disc 19 extends radially beyond the flange 11, in axially spaced relation to the mounting disc 12, with the space between the discs 19 and 12 flaring radially outwardly.

The anchor disc 19 is secured to the flange 11 by means of rivets 20. The opposite ends of the rivets extend through circumferentially elongated openings 21 in the inner region of the mounting disc 12 so as to form a lost motion oscillatory connection between the mounting disc and the hub.

Vulcanized to the opposed faces of the mounting disc 12 and anchor disc 19 is an annular cushion 22 of soft rubber or equivalent material which increases in thickness toward its periphery so as to fill the outwardly flaring space between the discs. The increased thickness toward the periphery allows the increased circumferential movement which is required at the periphery in the oscillation of the mounting disc relative to the anchor disc. The cushion 22 absorbs and dampens the oscillation through the setting up of shear stresses in the rubber.

The lost motion connection between the hub and the mounting disc is of such a character that the torque loads will normally be transmitted solely through the rubber cushion 22. An overload, however, may cause the mounting disc to engage the rivets 20, thus establishing a nonyielding drive connection between the hub and the mounting disc.

The mounting disc 12 is confined between the flange 11 and the enlarged heads 23 of the rivets 20. The heads 23 are maintained in spaced relationship to the flange 11 by means of intermediate shoulders 24 formed on the rivets, the shoulders 24 extending through the openings 21 and engaging the flange 11.

It may now be noted that the cushion 22 is vulcanized to substantially the entire exposed area of the mounting disc 12 between the tab 16 and the flange 11. Thus there is obtained a maximum area of driving connection between the cushion and the mounting disc, which is ample for transmitting torque from the disc to the hub. At the same time, the cushion tends to give axial support to the disc. As a result of this arrangement, extremely thin sheet metal may be employed in the mounting disc, where formerly it was considered necessary to employ sheet metal of more than twice the thickness.

In the form of the invention shown in Figure 3, additional axial support is given to the mounting disc by means of a washer 25 secured by the rivets 20 in engagement with the exposed face of the mounting disc 12. The washer 25 is secured by the rivets 20 in frictional engagement with the mounting disc 12 and in rigid association with the hub, so that the mounting disc 12 must, in order to oscillate, move in frictional engagement with the plate 25. Thus the plate 25 exerts a braking action against the mounting disc 12 which supplements the cushioning action of the cushion 22 so as to dampen out the oscillation more rapidly than would otherwise be possible.

Figure 4 shows a clutch driven member incorporating the improved arrangement wherein the rivets 20 serve the double function of securing the anchor disc 19 rigidly to the hub and forming a lost motion connection with the mounting disc 12a, which in this case is shown as being of relatively thick sheet metal comparable to that used in the old style clutch plates. In addition to the rivets 20, the securing means includes a washer 26 associated with the face of the mounting disc 12a opposite the flange 11 and coacting with the flange to embrace and give axial support to the inner region of the mounting disc 12a. The cushions 14a are also shown as being of the old type, formed of relatively heavy sheet metal.

I claim:

1. A friction clutch driven member comprising a hub having a radial flange, and torsionally yieldable means for connecting a friction facing to said flange, said means comprising a mounting member and a cushion anchor member associated with the respective sides of said flange and extending radially outwardly therebeyond in axially spaced relation, a securing element extending through said flange, one end of said element cooperating with said cushion anchor to rigidly secure the same to the flange in contact therewith and the other end of said element being arranged to cooperate with circumferentially spaced portions of the inner region of said mounting member to form a lost motion positive drive connection between said mounting member and the hub, said other end being provided with means cooperating with said flange to embrace and axially support said inner region and a cushion of resilient material interposed between and secured to said members and adapted to yieldingly transmit torque between said mounting member and said hub through shear stresses set up in said cushion.

2. In a friction clutch driven member, a hub having a radial flange, and torsionally yieldable means for connecting a friction facing to said flange, said means comprising an annular mounting disc and an annular cushion anchor associated with opposite sides of said flange and extending radially therebeyond in axially spaced relation, a plurality of securing elements extending through said flange, each cooperating with one end with said cushion anchor disc to rigidly secure the same to said flange and at its other end arranged to cooperate with circumferentially spaced portions of the inner region of said mounting disc to form a lost motion positive drive connection between said mounting disc and said hub, said other end being provided with means cooperating with said flange to embrace and axially support said inner region, and a cushion of resilient material interposed between and secured to said disc and anchor and adapted to cushion the torque reactions between said mounting disc and hub while transmitting torque therebetween by means of shear stresses set up in said cushion.

3. A clutch driven member as defined in claim 1, wherein said cushion comprises an annulus which is bonded to the opposed faces of said disc and anchor.

4. A clutch driven member as defined in claim 1, wherein said cushion comprises an annulus of soft rubber vulcanized to the faces of said disc and anchor.

5. A clutch driven member as defined in claim 1, wherein the inner region of said mounting disc is journalled upon the periphery of said hub.

6. A clutch driven member as defined in claim 1, wherein the inner region of said mounting disc is provided with circumferentially elongated openings through which said securing means project to form said lost motion connection.

7. A clutch driven member as defined in claim 1, wherein said clutch plate includes a ring secured by said other ends of said securing elements in engagement with said inner region.

8. A friction clutch driven member as defined in claim 1, wherein said mounting disc is of considerably less than .060" thickness, and wherein such torsional loads are distributed from the cushion to the major portion of the exposed area of the mounting disc.

9. A friction clutch driven member as defined in claim 1, wherein said mounting member is of sheet metal having a thickness considerably less than .060 inch and is secured to said cushion throughout a radial area that is ample for transmission of torsional loads developed between said hub and said mounting member.

10. A friction clutch driven member as defined in claim 1, wherein said mounting member is in the form of an annular disc of sheet metal having a thickness considerably less than .060 inch, wherein the inner region of said disc is journalled upon the periphery of the hub, and wherein the area of attachment of said disc to the cushion is a major portion of the area of said disc.

HAROLD NUTT.